United States Patent
Diaz-Cuellar et al.

(10) Patent No.: US 11,729,187 B2
(45) Date of Patent: Aug. 15, 2023

(54) ENCRYPTED OVERLAY NETWORK FOR PHYSICAL ATTACK RESILIENCY

(71) Applicant: Microsoft Technology Licensing, LLC, Redmond, WA (US)

(72) Inventors: Gerardo Diaz-Cuellar, Woodinville, WA (US); Venkata Subrahmanyam Raman, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 240 days.

(21) Appl. No.: 16/798,756

(22) Filed: Feb. 24, 2020

(65) Prior Publication Data

US 2021/0266336 A1    Aug. 26, 2021

(51) Int. Cl.
*H04L 9/40* (2022.01)

(52) U.S. Cl.
CPC ...... *H04L 63/1416* (2013.01); *H04L 63/0272* (2013.01); *H04L 63/0478* (2013.01); *H04L 63/0485* (2013.01); *H04L 63/061* (2013.01); *H04L 63/126* (2013.01)

(58) Field of Classification Search
CPC ............ H04L 63/0272; H04L 63/1416; H04L 63/0485; H04L 63/0435; H04L 63/061; H04L 63/0478; H04L 63/126
See application file for complete search history.

(56) References Cited

U.S. PATENT DOCUMENTS

| 7,310,730 | B1 | 12/2007 | Champagne et al. | |
|---|---|---|---|---|
| 9,391,801 | B2 | 7/2016 | Raghu | |
| 9,398,121 | B1 * | 7/2016 | Brandwine | H04L 67/10 |
| 10,397,189 | B1 | 8/2019 | Hashmi | |
| 10,439,820 | B2 | 10/2019 | Egner et al. | |
| 2008/0072312 | A1 | 3/2008 | Takeyoshi et al. | |
| 2012/0287922 | A1 * | 11/2012 | Heck | H04L 63/306 |
| | | | | 370/351 |
| 2016/0301695 | A1 | 10/2016 | Trivelpiece et al. | |
| 2019/0238510 | A1 | 8/2019 | Li et al. | |

(Continued)

FOREIGN PATENT DOCUMENTS

| WO | WO-0133359 A1 * | 5/2001 | ............... G06F 8/20 |
|---|---|---|---|
| WO | 2018145606 A1 | 8/2018 | |

OTHER PUBLICATIONS

"Configuring Basic Site-to-Site VPN in Cloud Edge", Retrieved From: https://web.archive.org/web/20180829043238/http:/docs.trendmicro.com/en-us/smb/cloud-edge-cloud-console-32-sp1/gateways/site-to-site-vpn.aspx, Aug. 29, 2018, 1 Page.

(Continued)

*Primary Examiner* — Brian F Shaw
(74) *Attorney, Agent, or Firm* — Ray Quinney & Nebeker; Tiffany Healy

(57) ABSTRACT

Devices and methods for protecting server devices from physical attacks use an encrypted overlay network to securely communicate between a trusted network and one or more host computer devices in communication with the trusted network. The devices and methods may generate VPN tunnels to communicate directly with individual host computer devices. The devices and methods may securely transmit data packets between the trusted network and the host computer devices using the VPN tunnels.

18 Claims, 6 Drawing Sheets

(56) References Cited

U.S. PATENT DOCUMENTS

2021/0036887 A1\* 2/2021 Meng ................ H04L 12/66

OTHER PUBLICATIONS

"Five Ways Riverbed Secures the IoT Edge", Retrieved From: https://www.riverbed.com/blogs/five-ways-riverbed-secures-the-iot-edge.html, Apr. 3, 2018, 5 Pages.

"High Availability and Data Protection With Dell EMC Isilon Scale-Out NAS", In White Paper of Dell, Dec. 2019, 38 Pages.

"VMware SD-WAN by VeloCloud on Intel® Architecture for Scalable WAN Connectivity", Retrieved From: https://www.velocloud.com/content/dam/digitalmarketing/velocloud/en/documents/VMware_BranchEdge_SB_final.pdf, Retrieved on: Nov. 25, 2019, pp. 1-6.

Kohli, et al., "Azure Data Box Edge Security and Data Protection", Retrieved From: https://docs.microsoft.com/en-us/azure/databox-online/data-box-edge-security, Aug. 21, 2019, 5 Pages.

Trifiro, et al., "Data at the Edge—Managing and Activating Information in a Distributed World", Retrieved Date: https://www.seagate.com/www-content/enterprise-storage/it-4-0/images/Data-At-The-Edge-UP1.pdf, Retrieved on: Nov. 25, 2019, 26 Pages.

"International Search Report and Written Opinion Issued in PCT Application No. PCT/US21/014049", dated Mar. 30, 2021, 12 Pages.

\* cited by examiner

| | 402 | 404 |
|---|---|---|
| | IP Trusted Network | Site Address Space |
| 406 | Trusted IP Address 1 _33_ | IP Address _23_ |
| 408 | Trusted IP Address 2 _35_ | IP Address _25_ |
| 410 | Trusted IP Address 3 _37_ | IP Address _27_ |
| | ⋮ | |

400

ENCRYPTED OVERLAY NETWORK FOR PHYSICAL ATTACK RESILIENCY

BACKGROUND

As data centers increase for cloud computing and/or data centers move towards remote locations, large amounts of computer devices may become vulnerable to physical attacks. For example, physical attacks on server rack networks may allow attackers to access data traffic flowing between hosts computing devices on the rack networks and data traffic flowing between host computer devices and the network.

These and other problems exist in protecting server hardware from physical attacks.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method. The method may include establishing, at a virtual private network (VPN) server on a trusted network, a first trusted internet protocol (IP) address for a first host computer device of a plurality of host computer devices on a network rack in communication with the trusted network, wherein the first trusted IP address is associated with a physical IP address of the first host computer device. The method may include using the first trusted IP address to establish a first VPN tunnel directly between the first host computer device and the VPN server over the physical IP address of the first host computer. The method may include securely transmitting data packets between the first host computer device and the VPN sever using the first VPN tunnel.

Another example implementation relates to a computer device. The computer device may include at least one memory to store data and instructions and at least one processor in communication with the at least one memory, wherein the at least one processor is operable to: establish a first trusted internet protocol (IP) address for a first host computer device of a plurality of host computer devices on a network rack in communication with a trusted network, wherein the first trusted IP address is associated with a physical IP address of the first host computer device; use the first trusted IP address to establish a first VPN tunnel directly between the first host computer device and a VPN server over the physical IP address of the first host computer; and securely transmit data packets between the first host computer device and the VPN sever using the first VPN tunnel.

Another example implementation relates to a computer-readable medium storing instructions executable by a computer device. The computer-readable medium may include at least one instruction for causing the computer device to establish a first trusted internet protocol (IP) address for a first host computer device of a plurality of host computer devices on a network rack in communication with a trusted network, wherein the first trusted IP address is associated with a physical IP address of the first host computer device. The computer-readable medium may include at least one instruction for causing the computer device to use the first trusted IP address to establish a first VPN tunnel directly between the first host computer device and a VPN server over the physical IP address of the first host computer. The computer-readable medium may include at least one instruction for causing the computer device to securely transmit data packets between the first host computer device and the VPN sever using the first VPN tunnel.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

DETAILED DESCRIPTION

Figure 1:
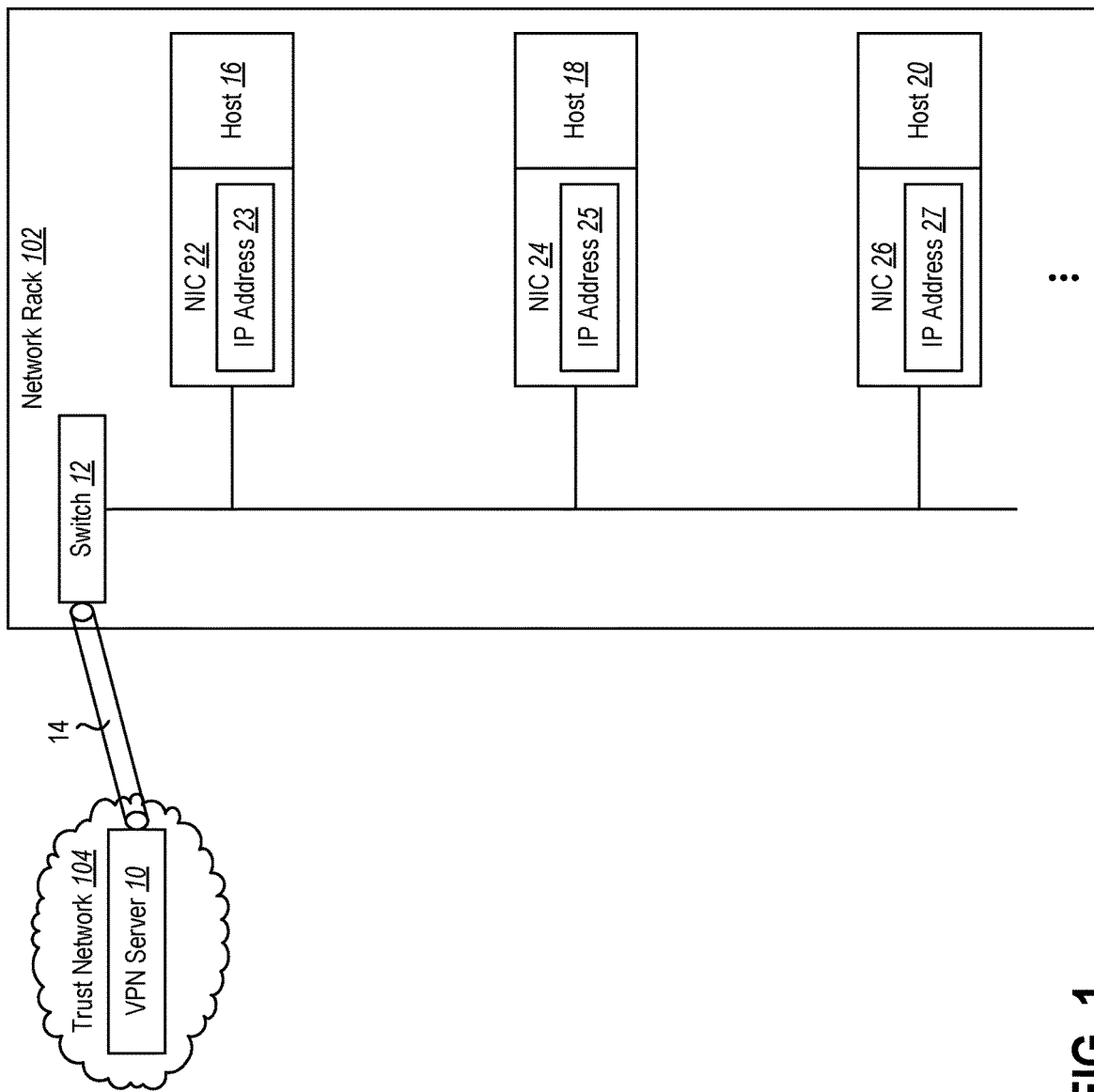
FIG. 1 is a schematic diagram of an example system illustrating a secure communication channel between a trusted network and a switch of a network rack in accordance with an implementation of the present disclosure.

This disclosure generally relates to using encrypted overlay networks to protect server devices from physical attacks. As data centers increase for cloud computing and/or data centers move towards remote locations, large amounts of computer devices may become vulnerable to physical attacks. Physical attacks may include using physical access to server devices to sniff, or otherwise, leak network traffic moving through a server network rack. Physical attacks may also include using physical access to server devices to tamper with, or otherwise modify, network data to mount attacks on the host computer devices on the server devices and/or to mount attacks on data centers. Physical attacks may also include using physical access to server devices to inject malicious data packets to attack the host computer devices on the server devices and/or mount attacks on the entire data network. Currently, server network racks in data centers may have limited security measures to prevent physical attacks on the network racks.

For example, data in transit across the network racks may be stolen by an attacker. In addition, an attacker may modify the data in transit across the network racks. An attacker may also inject bad commands or data into the communication channels of the server racks. Attackers may also have physical access to the one or more network ports for each of the host computer devices on the network racks. Switches and/or the host computer devices may be insecure and attackers with physical access to the devices may be able to remove, or otherwise access, memory, processors, and/or chips from the devices. For example, an attacker may access the devices and read information stored in the devices and/or and tamper with or modify data stored on the devices. Another example may include an attacker removing one or more of a memory, a processor, and/or chip and replacing the removed item with another item. Another example may include an attacker inserting or otherwise introducing bad data or viruses into the system using the physical access to the switches and/or host computer devices. Thus, the attacker may use the physical access to the networks racks to mount attacks on the host computer devices and/or a wider network.

The present disclosure includes several practical applications that provide benefits and/or solve problems associated with physical attacks on server devices. The present disclosure may add a boundary between an attacker with physical access to network racks and/or the network data. The present disclosure may use an encrypted overlay network to securely communicate between a trusted network and one or more network racks without requiring any changes to the host computer devices on the network racks and/or the data centers. The overlay network may have one or more policies of when to encrypt data towards other hosts and/or when to encrypt data towards a trusted network. Moreover, the host computer devices and/or the data centers may be unaware of the encrypted overlay network.

The present disclosure may encrypt all traffic between the host computer devices with IP level security at the secure smart network interface card (NIC). A secure smart NIC may be a NIC where all chips, components, and/or buses of the NIC are secured and boot correctly. The present disclosure may also encrypt all host computer device traffic to the trusted network with a virtual private network (VPN), which also may occur at the smart NIC card.

The present disclosure may protect east to west data communications between the trusted network and the host computer devices in the network racks by creating one or more encrypted VPN tunnels to securely communicate directly with the host computer devices. The present disclosure may overlay data packets to the host computer devices with an encrypted header. The encrypted header may include a trusted internet protocol (IP) address for the host devices so that the data packets may be transmitted using the encrypted VPN tunnels. The trusted IP addresses may be stored in a table and accessed when creating the secure data packets for transmission.

The present disclosure also protects inter-rack data transfers between different host computer devices in the network racks by encrypting the data transfers between different host computer devices. In an implementation, the present disclosure protects north to south traffic between the network rack and a customer accessing the network rack through an enterprise network. As such, data is encrypted on the network and protected while in transit through all intermediate devices in the network.

Thus, the present disclosure protects network secrets and prevents unauthorized physical access to data stored on the network racks and/or unauthorized access to data in transit through network racks.

Referring now to FIG. 1, illustrated is an example system 100 illustrating a secure communication between a trusted network 104 and one or more switches 12 of network racks 102 in communication with the trusted network 104 via a network. In an implementation, trusted network 104 may be a cloud computing system and the one or more network racks 102 may be in a remote location where attackers may have physical access to the network racks 102.

Network racks 102 may each have a switch 12 that may have a communication channel 28 that switch 12 uses to communicate with one or more host computer devices 16, 18, 20 on the network 102. Switch 12 may include a Top of Rack (ToR) switch that includes a full computing device with a central processing (CPU), memory, and busses.

Network racks 102 may include any number and variety of compute cores and/or host computer devices 16, 18, 20 thereon. One or more virtual machines may be implemented on the host computer device 16, 18, 20 of the server network racks 102. Switch 12 and/or host computer devices 16, 18, 20 may include features and functionality described below in connection with FIG. 7.

Each host computer device 16, 18, 20 may have a network interface card (NIC) 22, 24, 26 associated with the host computer devices 16, 18, 20. In addition, each NIC 22, 24, 26 may have an IP address 23, 25, 27 that identifies the physical site IP address of each of the host computer devices 16, 18, 20. The trusted network 104 may use the physical IP addresses 23, 25, 27 to transmit data packets to each of the host computer devices 16, 18, 20 and/or receive data packets from each of the host computer devices 16, 18, 20.

In an implementation, the trusted network 104 may use a VPN server 10 to establish a secure communication channel 14 between the trusted network 104 and the switches 12 of network racks 102 so that the data packets transmitted between the trusted network 104 and the switches 12 may be encrypted. For example, the secure communication channel 14 may be an encrypted VPN connection. As such, switch 12 may store the connection information for the VPN connection as well as coordinate the transmission of data packets from the rack network to the trusted network data centers.

However, even if the communications between the trusted network 104 and the switches 12 may be secure, the network racks 102 may still be vulnerable to physical attacks. For example, the data communication channels 28 between the host computer devices 16, 18, 20 and the switches 12 may be insecure, and thus, attackers with physical access to the communication channels 28 may be able to read or otherwise access data in transit across communication channels 28. As such, additional security may be required to ensure that communications that occur over data communication channel 28 may also be secured. For example, additional hop to hop security may be needed to encrypt data traffic from the switch 12 to each NIC 22, 24, 26.

Figure 2:
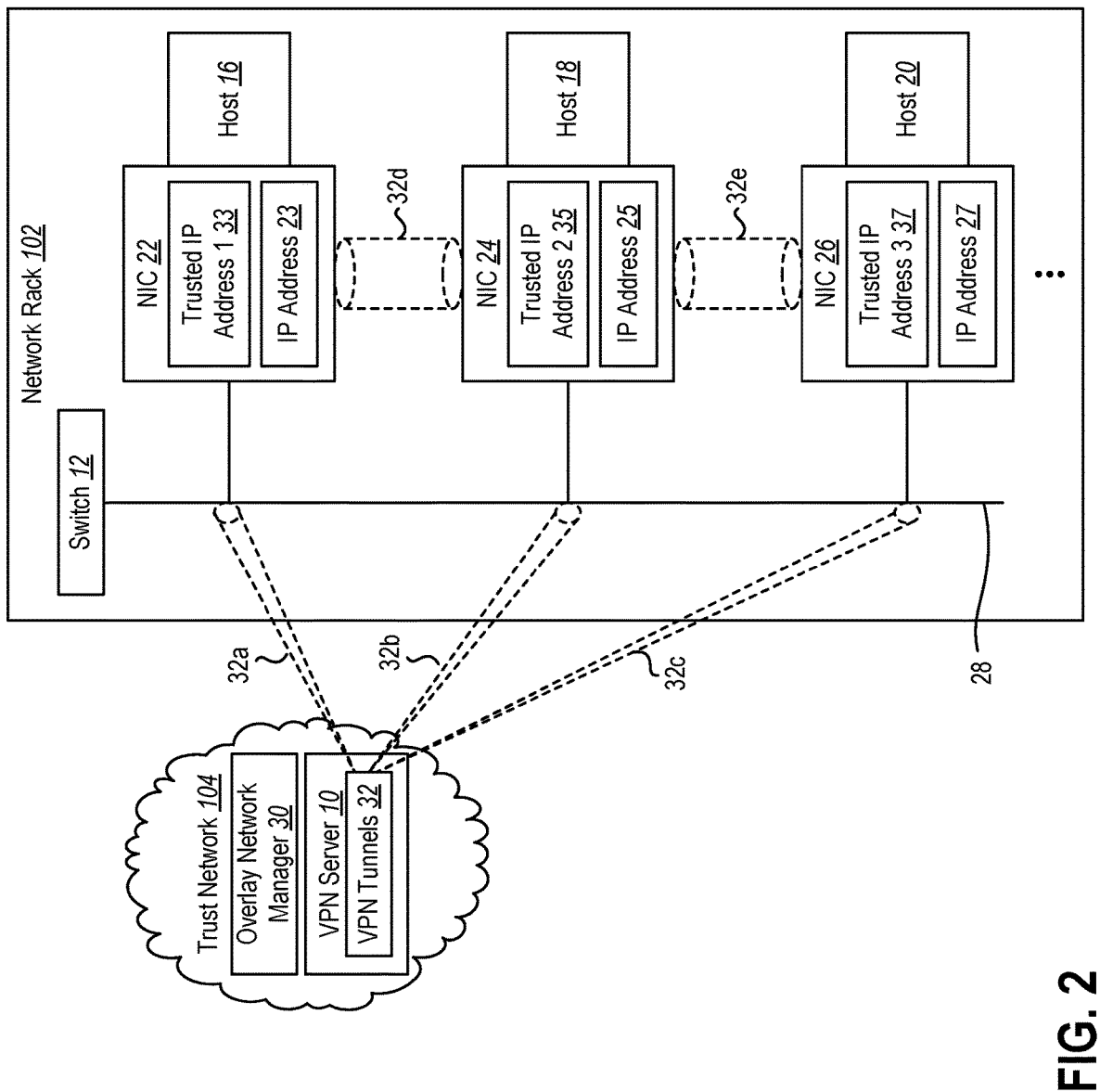
FIG. 2 is a schematic diagram of an example system illustrating using an encrypted overlay network for communicating between a trusted network and a network rack in accordance with an implementation of the present disclosure.

Referring now to FIG. 2, illustrated is an example system 200 for using an encrypted overlay network for communicating between a trusted network 104 and one or more network racks 102. Trusted network 104 and network racks 102 may have similar features as those described in FIG. 1. The trusted network 104 may be in communication with one or more remote server network racks 102 via a wired or wireless network. The one or more remote server network racks 102 may be across multiple geographic locations.

Network racks 102 may include any number and variety of compute cores and/or host computer devices 16, 18, 20 thereon. In addition, one or more virtual machines may be implemented on the host computer device 16, 18, 20 of the server network racks 102.

Each host computer device 16, 18, 20 may have an individual NIC 22, 24, 26. In an implementation, NICs 22, 24, 26 may be a secure smart NIC capable of performing hardware acceleration technologies to perform encryption. A secure smart NIC may be a NIC where all chips, components, and/or buses of the NIC are secured and/or boot correctly. NICs 22, 24, 26 may have a physical IP address 23, 25, 27 identifying the physical locations of the host computer devices 16, 18, 20.

Trusted network 104 may include a VPN server 10 that may be used to communicate with host computer devices 16, 18, 20 on network racks 102. VPN server 10 may include a full computing device with one or more processors, memories, and/or busses. VPN server 10 may include features and functionality described below in connection with FIG. 7.

In addition, trusted network 104 may include an overlay network manager 30 that may receive one or more requests to use or otherwise access data one or more host computer devices 16, 18, 20 on network racks 102. Overlay network manager 30 may coordinate the generation of an encrypted overlay network to securely communicate with the host computer devices 16, 18, 20 on network racks 102 for the requested data access. Overlay network manager 30 may be in communication with VPN server 10 and/or may be part of VPN server 10.

The components of the overlay network manager 30 may include hardware, software, or both. For example, the components of the overlay network manager 30 may include one or more instructions stored on a computer-readable storage medium and executable by processors of one or more computing devices. When executed by the one or more processors, the computer-executable instructions of one or more computing devices (e.g., VPN server 10) can perform one or more methods described herein. Alternatively, the components of the overlay network manager 30 may include hardware, such as a special purpose processing device to perform a certain function or group of functions. Additionally, or alternatively, the components of the overlay network manager 30 may include a combination of computer-executable instructions and hardware.

VPN server 10 may receive a request or other notification from overlay network manager 30 to generate the encrypted overlay network. VPN server 10 may establish trusted IP addresses 33, 35, 37 corresponding to the physical IP address 23, 25, 27 of host computer devices 16, 18, 20.

In an implementation, VPN server 10 may send out a broadcast message to the one or more host computer devices 16, 18, 20 using the physical IP addresses 23, 25, 27 to establish the trusted IP addresses 33, 35, 37. The broadcast message may be an encrypted packet with a common key. The host computer devices 16, 18, 20 may respond to the broadcast message and VPN server 10 may use the common key to start a point to point negotiation with the host computer devices 16, 18, 20 to establish one or more secure VPN tunnels with host computer devices 16, 18, 20. In another implementation, a service may be used to exchange the common key between VPN server 10 and the one or more host computer devices 16, 18, 20.

In an implementation, secure NICs 22, 24, 26 may store the VPN access information and/or the common key transmitted via the broadcast message. In another implementation, a common central repository behind VPN server 10 that stores the trusted IP addresses 33, 35, 37 and/or the common keys may share the trusted IP addresses 33, 35, 37 and/or the common keys. In another implementation, the common key may be used to encrypt the data packets transmitted on the secure VPN tunnels.

VPN server 10 may generate one or more trusted IP addresses 33, 35, 37 that correspond to the one or more physical IP addresses 23, 25, 27. In an implementation, as the host computer devices 16, 18, 20 respond to the broadcast message VPN server 10 may build a table with the association of the trusted IP addresses 33, 35, 37 to the physical IP addresses 23, 25, 27 of host computer devices 16, 18, 20.

VPN server 10 may use the trusted IP addresses 33, 35, 37 to establish the one or more encrypted VPN tunnels with host computer devices 16, 18, 20. VPN server 10 may use the association between the trusted IP addresses 33, 35, 37 and the physical IP addresses 23, 25, 27 from the table to establish the one or more encrypted VPN tunnels with host computer devices 16, 18, 20. VPN server 10 may establish VPN tunnel 32a with host computer device 16 allowing host computer device 16 to directly communicate with trusted network 104 via VPN tunnel 32a. For example, VPN tunnel 32a may be generated over physical IP address 23 and the trusted IP address 33 traffic may be sent inside VPN tunnel 32a. VPN server 10 may also establish VPN tunnel 32b with host computer device 18 allowing host computer device 18 to directly communicate with trusted network 104 using VPN tunnel 32b. For example, VPN tunnel 32b may be generated over physical IP address 25 and the trusted IP address 35 traffic may be sent inside VPN tunnel 32b. In addition, VPN server 10 may establish VPN tunnel 32c with host computer device 20 allowing host computer device 20 to directly communicate with trusted network 104 using VPN tunnel 32c. For example, VPN tunnel 32c may be generated over physical IP address 27 and the trusted IP address 37 traffic may be sent inside VPN tunnel 32c. As such, VPN server 10 may establish individual VPN tunnels 32a, 32b, 32c with each of the host computer devices 16, 18, 20 to securely transmit data packets between host computer devices 16, 18, 20 and the trusted network 104. Host computer devices 16, 18, 20 may only be aware of the trusted IP addresses 33, 35, 37 and may use the trusted IP addresses 33, 35, 37 when transmitting data packets and/or receiving data packets from the trusted network 104.

In addition, one or more secure communication channels 32d, 32e may be established between various NICs 22, 24, 26 of host computer devices 16, 18, 20 using the physical IP addresses 23, 25, 27. The one or more secure communication channels 32d, 32e may be established between physical IP addresses 23, 25, 27 using table 400 (FIG. 4) that indexes a trusted IP addresses 33, 35, 37 to a physical IP address 23, 25, 27. For example, a tunnel may be established from physical IP address 23 and physical IP address 25 using table 400 that indexes physical IP address 23 to trusted IP address 33 and physical IP address 25 to trusted IP address 35. Thus, a data packet may be transmitted from trusted IP address 33 to trusted IP address 35 by encapsulating the data packet in a secure communication channel 32d by directly sending the data packet using physical IP address 23 and physical IP address 25 correspondingly.

In an implementation, VPN server 10 may establish the one or more secure communication channels 32d, 32e between various NICs 22, 24, 26 of host computer devices 16, 18, 20. For example, when data packets are transmitted between host computer device 16 and host computer device 18, VPN server 10 may establish a secure communication channel 32d using the trusted IP address 33 of host computer device 16 and the trusted IP address 35 of host computer device 18. In addition, when data packets are transmitted between host computer device 18 and host computer device 20, VPN server 10 may establish a secure communication channel 32e using the trusted IP address 35 of host computer device 18 and the trusted IP address 37 of host computer device 20. In an implementation, secure communication channels 32d, 32e may be an encrypted VPN tunnel. As such, data packets may be securely transmitted between the host computer devices 16, 18, 20.

Thus, even if an attacker has physical access to data communication channel 28, NICs 22, 24, 26, and/or host computer devices 16, 18, 20, the attacker may not be able to read the data in transit and/or modify or inject data into the system because the attacker is unable to communicate with the system without the common key. Moreover, since each of the host computer devices 16, 18, 20, are directly communicating with the trusted network 104 via individual encrypted VPN tunnels, switch 12 may not be involved in the transfer of the data packets between the host computer devices 16, 18, 20 and the trusted network 104. As such, even if an attacker accesses switch 12, the attacker may not use switch 12 to attack the data center or the trusted network 104.

As such, system 200 may be used to protect network secrets and prevent unauthorized physical access to data stored on the network racks 102 and/or in transit through the network racks 102.

Figure 3:
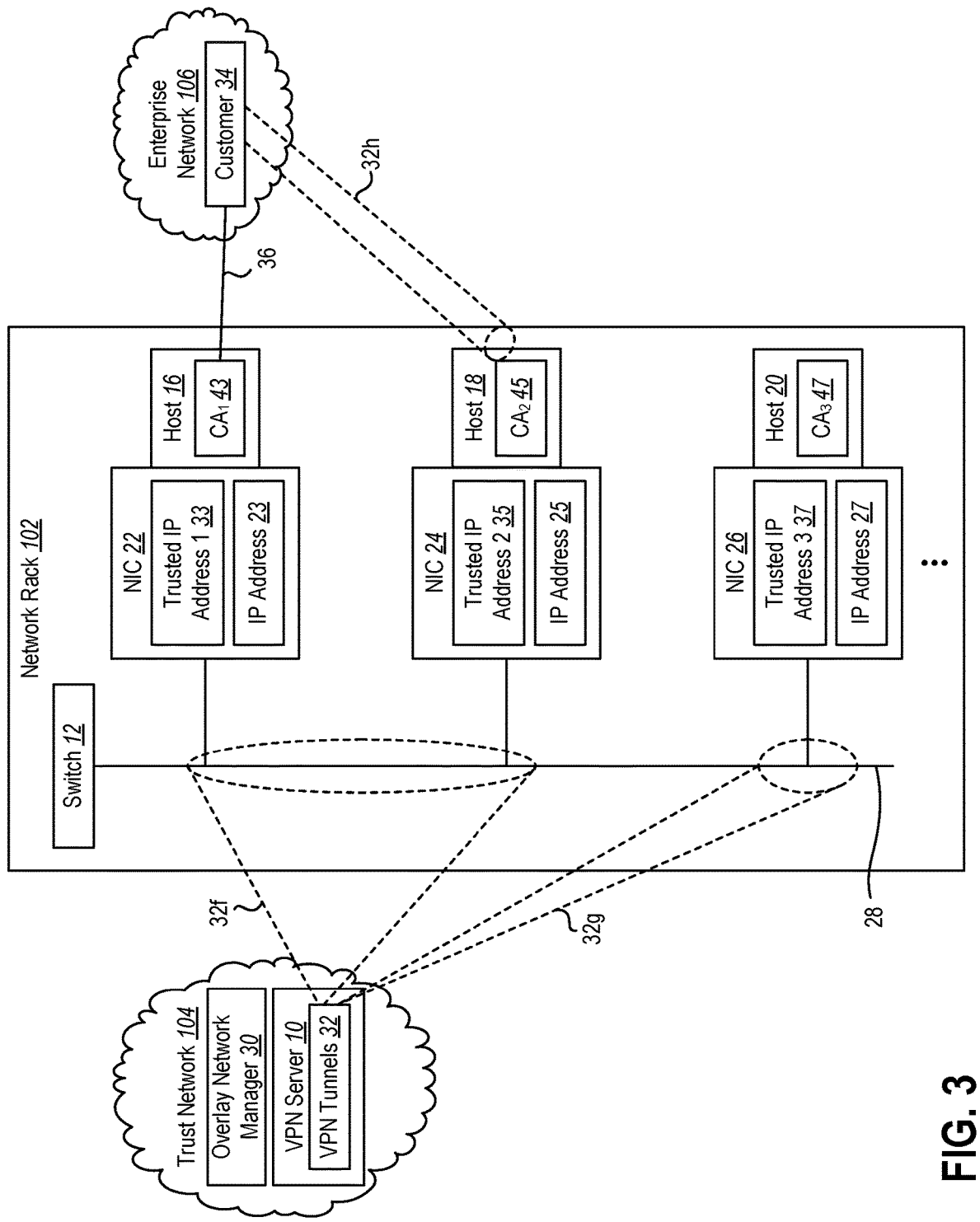
FIG. 3 is a schematic diagram of an example system illustrating using an encrypted overlay network for communicating between a trusted network and a network rack in accordance with an implementation of the present disclosure.

Referring now to FIG. 3, illustrated is another implementation of example system 200 for using an encrypted overlay network for communicating between a trusted network 104 and one or more network racks 102 and communicating between one or more customers 34 of an enterprise network 106. Trusted network 104 and network racks 102 may have similar features as those described in FIGS. 1 and 2.

In an implementation, VPN server 10 of trusted network 104 may want to communicate with a plurality of host computer devices 16, 18, 20 at the same time. As such, VPN server 10 may access a plurality of trusted IP addresses 33, 35, 37 for a plurality of host computer devices 16, 18, 20. For example, VPN server 10 may access a table 400 (FIG. 4) of the trusted IP addresses 33, 35, 37 and may select a first trusted IP address 33 associated with a first host computer device 16 and a second trusted IP address 35 associated with a second host computer device 18.

VPN server 10 may use the first trusted IP address 33 and a second trusted IP address 35 to generate an encrypted VPN tunnel 32f in communication with both host computer device 16 and host computer device 18. For example, the first trusted IP address 33 and the second trusted IP address 35 may be provided by VPN server 10 to host computer device 16 and host computer device 18 allowing the first trusted IP address 33 and the second trusted IP address 35 to communicate with trusted network 104. The encrypted VPN tunnel 32f may be generated over the physical IP address 23 and the physical IP address 25. Physical IP address 23 and physical IP address 25 may send the encrypted data packets inside the encrypted VPN tunnel 32f where the first trusted IP address 33 and the second trusted IP address 35 data packets are sent. As such, both host computer device 16 and host computer device 18 may transmit data packets to trusted network 104 and/or receive data packets from trusted network 104 via the same encrypted VPN tunnel 32f.

In addition, VPN server 10 may access table 400 to identify a trusted IP address 37 for host computer device 20. VPN server 10 may use the trusted IP address 37 for generating an encrypted VPN tunnel 32g with host computer device 20. As such, host computer device 20 may send data packets to and/or receive data packets from trusted network 104 using encrypted VPN tunnel 32g while host computer device 18 and/or host computer device 16 may communicate with trusted network 104 using encrypted VPN tunnel 32f.

In another implementation, one or more customers 34 or other third parties may send a request to communicate directly with one or more host computer devices 16, 18, 20 on network racks 102. Customers 34 may be able to access host computer devices 16, 18, 20 via an enterprise network 106. Host computer devices 16, 18, 20 may each have an associated client address 43, 45, 47 that identifies the host computer devices 16, 18, 20 to customers 34 or third parties. In an implementation, customers 34 may be able to access host computer devices 16, 18, 20 through a telecommunications network using a mobile device. Client addresses 43, 45, 47 may be in the telecommunication address space allowing mobile devices to communicate with client addresses 43, 45, 47. Customers 34 may be able to communicate with the host computer devices 16, 18, 20 in a variety of ways using the client addresses 43, 45, 47. For example, customers 34 may establish a connection 36 to host computer device 16 using client address 43. Customer 34 may be identified as outside of the trusted network 104, and thus, connection 36 may be an unencrypted communication channel. Another option may include establishing an encrypted communication channel 32h using an overlay network to communicate with customer 34 via host computer device 18. The overlay network may have one or more policies of when to encrypt data towards other hosts and/or when to encrypt data towards trusted network 104. In addition, the overlay network may have one or more polices of whether to encrypt client addresses 43, 45, 47 and/or whether to continue encryption until the destination. As such, system 200 provides flexibility in communicating with different host computer devices 16, 18, 20 and/or different customers 34.

Figures 4, 5:
FIG. 4 is an example of a table for use with a system in accordance with an implementation of the present disclosure.
FIG. 5 is an example of a data packet header for use with a system in accordance with an implementation of the present disclosure.

Referring now to FIG. 4, an example table 400 illustrates the association between the trusted IP addresses 33, 35, 37 and the physical IP addresses 23, 25, 27 of host computer devices 16, 18, 20 (FIGS. 1-3). Table 400 may include a column for the trusted network 402 with the trusted IP addresses 33, 35, 37 of host computer devices 16, 18, 20. Table 400 may also include a column 404 for the site address space with the physical IP addresses 23, 25, 27 of host computer devices 16, 18, 20. Table 400 may also include a plurality of rows 406, 408, 410. Each row 406, 408, 410 may illustrate an association between the trusted IP addresses 33, 35, 37 and the corresponding physical IP addresses 23, 25, 27. Table 400 may be dynamically updated as new host computer devices are identified and/or removed from the network racks 102 (FIGS. 1-3).

VPN server 10 may use table 400 in establishing the one or more VPN tunnels 32 for communicating with host computer devices 16, 18, 20. In addition, VPN server 10 may use table 400 for determining the headers of the data packets for transmission to the one or more host computer devices 16, 18, 20. For example, VPN server 10 may access rows 406, 408, 410 in table 400 to identify the physical IP addresses 23, 25, 27 of host computer devices 16 and the corresponding trusted IP addresses 33, 35, 37. VPN server 10 may generate an encrypted header with the trusted IP addresses 33, 35, 37 to use in transmitting the data packets between the trusted network 104 and host computer devices 16, 18, 20. In addition, VPN server 10 may generate an encrypted header with the trusted IP addresses 33, 35, 37 when transmitting data packets between host computer devices 16, 18, 20.

As such, table 400 may be used by VPN server 10 to build the associations between the trusted IP addresses 33, 35, 37 of the trusted network and the site physical IP addresses 23, 25, 27 of the host computer devices 16, 18, 20. In addition, table 400 may be used by VPN server 10 to generate the encrypted overlay network for communicating between the trusted network 104 and one or more host computer devices 16, 18, 20 on the network racks 102.

Referring now to FIG. 5, an example of a data packet header 500 for use by VPN server 10 to transmit data packets between trusted network 104 and one or more host computer devices 16, 18, 20 on a network rack 102 in communication with trusted network 104 and/or transmit data packets between host computer devices 16, 18, 20 on the network rack in communication with trusted network 104.

In an implementation, data packet header 500 may have a first section 502 identifying the physical IP address 23 of a first host computer device 16 and the physical IP address 25 of a second host computer device 18. As such, data packet 500 may be transmitted from the first host computer device 16 to the second host computer device 18. Data packet header 500 may also have an encryption section 504 used to encrypt the data packet. Data packet header 500 may also have a third section 506 that identifies the trusted IP address 33 of the first host computer device 16 and the trusted IP address 35 of the second host computer device 18. The third section 506 of the data packet header 500 may be used to transmit the data packet 500 between the first host computer device 16 and the second host computer device 18.

Figure 6:
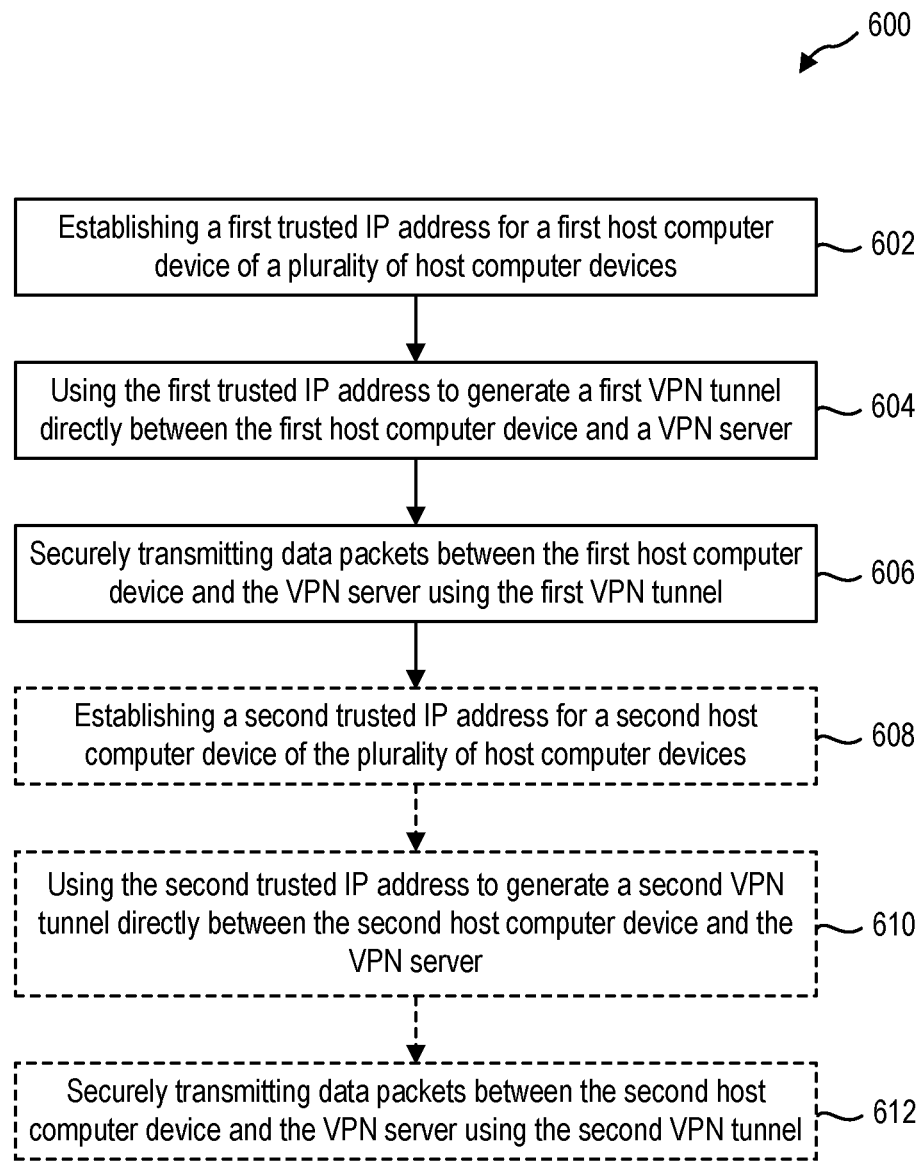
FIG. 6 is a flow diagram of an example method flow for generating an encrypted overlay network for communicating between a trusted network and one or more host computer devices of a network rack in accordance with an implementation of the present disclosure.

Referring now to FIG. 6, an example method 600 may be used by a VPN server 10 (FIG. 2) to generate an encrypted overlay network for communicating between a trusted network 104 (FIG. 2) and one or more host computer devices 16, 18, 20 (FIG. 2) of one or more server network racks 102 (FIG. 2). The actions of method 600 may be discussed below with reference to the architectures of FIGS. 1-3.

At 602, method 600 may include establishing a first trusted IP address for a first host computer device of a plurality of host computer devices on a network rack. VPN server 10 of a trusted network 104 may receive a request or other notification to generate an encrypted overlay network for communicating with the plurality of host computer devices 16, 18, 20 on network rack 102. For example, trusted network 104 may want to transmit to and/or receive data packets from one or more host computer devices 16, 18, 20.

VPN server 10 may establish trusted IP addresses 33, 35, 37 corresponding to the physical IP address 23, 25, 27 of host computer devices 16, 18, 20. In an implementation, VPN server 10 may send out a broadcast message to the physical addresses 23, 25, 27 of the one or more host computer devices 16, 18, 20 to establish the trusted IP addresses 33, 35, 37. The broadcast message may be an encrypted data packet with a common key. The host computer devices 16, 18, 20 may respond to the broadcast message and VPN server 10 may start a point to point negotiation with each of the host computer devices 16, 18, 20 to establish one or more secure VPN tunnels with each host computer devices 16, 18, 20. In another implementation, a service may be used to exchange keys between VPN server 10 and the one or more host computer devices 16, 18, 20.

In an implementation, secure NICs 22, 24, 26 of host computer devices 16, 18, 20 may store the VPN access information and/or the common key transmitted via the broadcast message. In another implementation, a common central repository behind VPN server 10 that stores the trusted IP addresses 33, 35, 37 and/or the common keys may share the trusted IP addresses 33, 35, 37 and/or the common keys. In another implementation, the common key may be used to encrypt the data packets transmitted on the secure VPN tunnels.

VPN server 10 may generate one or more trusted IP addresses 33, 35, 37 that correspond to the one or more physical IP addresses 23, 25, 27. In an implementation, as the host computer devices 16, 18, 20 respond to the broadcast message VPN server 10 may build a table 400 (FIG. 4) with the association of the trusted IP addresses 33, 35, 37 to the physical IP addresses 23, 25, 27. VPN server 10 may use table 400 to identify the trusted IP addresses 33, 35, 37 for each of the host computer devices 16, 18, 20. For example, row 406 (FIG. 4) of table 400 may identify that a first trusted IP address 33 may correspond to physical IP address 23 of a first host computer device 16. Row 408 (FIG. 4) of table 400 may identify that a second trusted IP address 35 may correspond to physical IP address 25 of a second host computer device 18. Row 410 (FIG. 4) of table 400 may identify that a third trusted IP address 37 may correspond to physical address 27 of a third host computer device 20.

At 604, method 600 may include using the first trusted IP address to generate a first VPN tunnel directly between the first host computer device and the VPN server. VPN server 10 may use the trusted IP addresses 33, 35, 37 to establish the one or more encrypted VPN tunnels with host computer devices 16, 18, 20. For example, VPN server 10 may establish VPN tunnel 32a with host computer device 16 allowing host computer device 16 to directly communicate by sending data packets to trusted network 104 and/or receiving data packets from trusted network 104 via VPN tunnel 32a. VPN tunnel 32a may be created or connected over physical IP address 23 and physical IP address 23 may send the encrypted data packets inside VPN tunnel 32a inside which the trusted IP address 33 traffic may be sent.

At 606, method 600 may include securely transmitting data packets between the first host computer device and the VPN server using the first VPN tunnel. VPN server 10 may generate an encrypted header with the trusted IP address 33 to use in transmitting the data packets between the trusted network 104 and the first host computer device 16. In addition, VPN server 10 may generate an encrypted header with the trusted IP addresses 33, 35, 37 when transmitting data packets between host computer devices 16, 18, 20.

In an implementation, VPN server 10 may use table 400 for determining the headers of the data packets for transmission to the one or more host computer devices 16, 18, 20. For example, VPN server 10 may access row 406 in table 400 to identify the physical IP addresses 23 of host computer device 16 and the corresponding trusted IP addresses 33. VPN server 10 may generate an encrypted header using the information from table 400. As such, data packets may flow over the physical IP address 23 using the trusted IP address 33 and VPN server 10 may use the first VPN tunnel 32a to securely transmit data packets to the first host computer device 16 and/or receive data packets from the first host computer device 16.

At 608, method 600 may optionally include establishing a second trusted IP address for a second host computer device of the plurality of host computer devices on the network rack. VPN server 10 may use table 400 to identify the trusted IP addresses 33, 35, 37 for each of the host computer devices 16, 18, 20. For example, VPN server 10 may access row 408 to identify that a second trusted IP address 35 corresponds to physical IP address 25 of a second host computer device 18.

At 610, method 600 may optionally include using the second trusted IP address to generate a second VPN tunnel directly between the second host computer device and the VPN server. VPN server 10 may also establish VPN tunnel 32b with host computer device 18 allowing host computer device 18 to directly communicate with trusted network 104 using VPN tunnel 32b. For example, VPN tunnel 32b may be created or connected over physical IP address 25 and physical IP address 25 may send the encrypted data packets inside VPN tunnel 32b inside which the trusted IP address 35 traffic may be sent. Thus, VPN server 10 may establish individual VPN tunnels 32a, 32b, 32c over the respective physical IP address 23, 25, 27 of each of the host computer devices 16, 18, 20 to securely transmit data packets between host computer devices 16, 18, 20 and the trusted network 104.

At 612, method 600 may optionally include securely transmitting data packets between the second host computer device and the VPN sever using the second VPN tunnel. VPN server 10 may generate an encrypted header with the trusted IP address 35 to use in transmitting the data packets between the trusted network 104 and the second host computer device 18.

In an implementation, VPN server 10 may use table 400 for determining the headers of the data packets for transmission to the one or more host computer devices 16, 18, 20. For example, VPN server 10 may access row 408 in table 400 to identify the physical IP address 25 of the second host computer device 18 and the corresponding trusted IP addresses 35. VPN server 10 may generate an encrypted header using the information from table 400. As such, data packets may flow over the physical IP address 25 using the trusted IP address 35 and VPN server 10 may use the second VPN tunnel 32b to securely transmit data packets to the second host computer device 18 and/or receive data packets from the second host computer device 18.

Method 600 may optionally include establishing one or more one or more encrypted communication channels between one or more host computer devices on the network rack. For example, VPN server 10 may establish one or more encrypted communication channels 32d, 32e between various NICs 22, 24, 26 of host computer devices 16, 18, 20. The one or more secure communication channels 32d, 32e may be established between site IP addresses 23, 25, 27 using table 400 (FIG. 4) that indexes a trusted IP addresses 33, 35, 37 to a site IP address 23, 25, 27. For example, a tunnel may be established from site IP address 23 and site IP address 25 using table 400 that indexes site IP address 23 to trusted IP address 33 and site IP address 25 to trusted IP address 35. Thus, a data packet may be transmitted from trusted IP address 33 to trusted IP address 35 by encapsulating the data packet in a secure communication channel 32d by directly sending the data packet using site IP address 23 and site IP address 25 correspondingly. In another implementation, VPN server 10 may establish an encrypted communication channel 32d using the trusted IP address 33 of host computer device 16 and the trusted IP address 35 of host computer device 18. In addition, when data packets are transmitted between host computer device 18 and host computer device 20, VPN server 10 may establish an encrypted communication channel 32e using the trusted IP address 35 of host computer device 18 and the trusted IP address 37 of host computer device 20. In an implementation, encrypted communication channels 32d, 32e may be an encrypted VPN tunnel. As such, method 600 may be used to securely transmit data packets between the host computer devices 16, 18, 20.

Method 600 may also be used to generate an encrypted overlay network for communicating between the trusted network 104 and one or more host computer devices 16, 18, 20 on the network racks 102 and/or for communications between host computers devices 16, 18, 20 on the network racks 102. Using the encrypted overlay network for communications may protect network secrets and may prevent unauthorized physical access to data stored on the network racks and/or in transit through the network racks.

Figure 7:
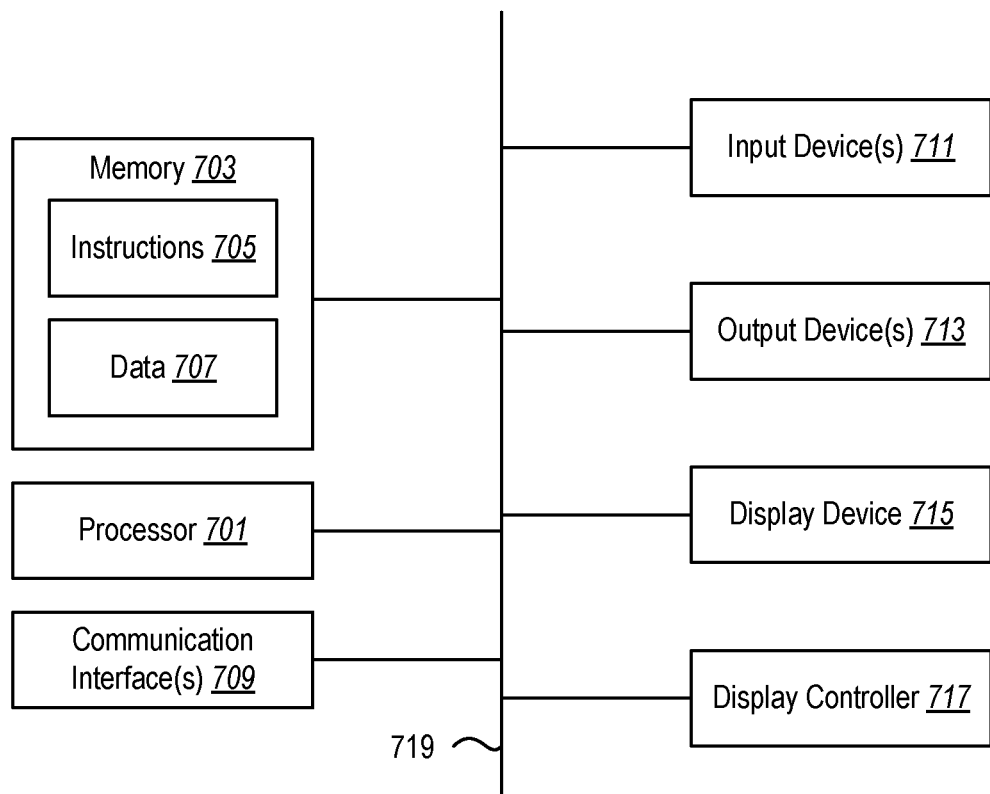
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715. Display controller 717 may be used for remote displays.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising: establishing, at a virtual private network (VPN) server on a trusted network, a first trusted internet protocol (IP) address for a first host computer device of a plurality of host computer devices on a network rack in communication with the trusted network, wherein the first trusted IP address is associated with a physical IP address of the first host computer device; using the first trusted IP address to establish a first VPN tunnel directly between the first host computer device and the VPN server over the physical IP address of the first host computer device; securely transmitting data packets between the first host computer device and the VPN sever using the first VPN tunnel; and establishing a second trusted IP address for a second host computer device of the plurality of host computer devices on the network rack in communication with the trusted network, wherein the second trusted IP address is associated with a physical IP address of the second host computer device, wherein establishing the first trusted IP address and the second trusted IP address further comprises exchanging using a common key received in a broadcast message with a packet encrypted with the common key sent to the physical IP address associated with the first host computer device and to the physical IP address of the second host computer device.

2. The method of claim 1, further comprising:
   using the second trusted IP address to generate a second VPN tunnel directly between the second host computer device and the VPN server over the physical IP address of the second host computer device; and
   securely transmitting the data packets between the second host computer device and the VPN server using the second VPN tunnel.

3. The method of claim 1, further comprising:
   using the first trusted IP address and the second trusted IP address to communicate the first VPN tunnel between the first host computer device and the second host computer device over the physical IP address of the first host computer and the physical IP address of the second host computer device;
   securely transmitting the data packets between the first host computer device and the VPN sever using the first VPN tunnel; and
   securely transmitting the data packets between the second host computer device and the VPN server using the first VPN tunnel.

4. The method of claim 1, further comprising:
   establishing an encrypted communication channel between a first network interface card (NIC) of the first host computer device and a second network interface card (NIC) of the second host computer device using the first trusted IP address and the second trusted IP address; and
   securely transmitting the data packets between the first host computer device and the second host computer device using the encrypted communication channel.

5. The method of claim 1, wherein establishing the first trusted IP address and the second trusted IP address further comprises:
   exchanging the common key between the first host computer device, the second host computer device, and the VPN server; or
   sending the broadcast message with the encrypted packet with the common key to the physical IP address associated with the first host computer device and the physical address associated with the second host computer device; and receiving a response to the broadcast message from the first host computer device and the second host computer device.

6. The method of claim 5, further comprising:
using the common key to encrypt the data packets transmitted via the first VPN tunnel and a second VPN tunnel.

7. The method of claim 5, further comprising:
using the responses to build a table with an association between the physical IP address of the plurality of host computer devices and a trusted IP address for each of the plurality of host computer devices.

8. The method of claim 1, further comprising:
receiving a request from a customer to access one of the plurality of host computer devices; and
using a nonencrypted communication channel to communicate between one host computer device of the plurality of host computer devices and the customer.

9. The method of claim 1, further comprising:
receiving a request from a customer to access one of the plurality of host computer devices; and
using an encrypted communication channel to communicate between one host computer device of the plurality of host computer devices and the customer.

10. A computer device, comprising: at least one memory to store data and instructions; and at least one processor in communication with the at least one memory, wherein the at least one processor is operable to: establish a first trusted internet protocol (IP) address for a first host computer device of a plurality of host computer devices in communication with a trusted network, wherein the first trusted IP address is associated with a physical IP address of the first host computer device; use the first trusted IP address to establish a first VPN tunnel directly between the first host computer device and a VPN server over the physical IP address of the first host computer device; securely transmit data packets between the first host computer device and the VPN sever using the first VPN tunnel; and establish a second trusted IP address for a second host computer device of the plurality of host computer devices in communication with the trusted network, wherein the second trusted IP address is associated with a physical IP address of the second host computer device, wherein establishing the first trusted IP address and the second trusted IP address includes using a common key received in a broadcast message with a packet encrypted with the common key sent to the physical IP address associated with the first host computer device and to the physical IP address of the second host computer device.

11. The computer device of claim 10, wherein the at least one processor is further operable to:
use the second trusted IP address to generate a second VPN tunnel directly between the second host computer device and the VPN server over the physical IP address of the second host computer device; and
securely transmit the data packets between the second host computer device and the VPN server using the second VPN tunnel.

12. The computer device of claim 10, wherein the at least one processor is further operable to:
use the first trusted IP address and the second trusted IP address to communicate the first VPN tunnel between the first host computer device and the second host computer device over the physical IP address of the first host computer and the physical IP address of the second host computer device;
securely transmit the data packets between the first host computer device and the VPN sever using the first VPN tunnel; and
securely transmit the data packets between the second host computer device and the VPN server using the first VPN tunnel.

13. The computer device of claim 10, wherein the at least one processor is further operable to:
establish an encrypted communication channel between a first network interface card (NIC) of the first host computer device and a second network interface card (NIC) of the second host computer device using the first trusted IP address and the second trusted IP address; and
securely transmit the data packets between the first host computer device and the second host computer device using the encrypted communication channel.

14. The computer device of claim 10, wherein the at least one processor is further operable to establish the first trusted IP address and the second trusted IP address by:
exchanging the common key between the first host computer device, the second host computer device, and the VPN server; or
sending the broadcast message with the encrypted packet with the common key to the physical IP address associated with the first host computer device and the physical address associated with the second host computer device; and
receiving a response to the broadcast message from the first host computer device and the second host computer device.

15. The computer device of claim 14, wherein the at least one processor is further operable to:
use the common key to encrypt the data packets transmitted via the first VPN tunnel and a second VPN tunnel.

16. The computer device of claim 14, wherein the at least one processor is further operable to:
use the responses to build a table with an association between the physical IP address of the plurality of host computer devices and a trusted IP address for each of the plurality of host computer devices.

17. The computer device of claim 10, wherein the at least one processor is further operable to:
receive a request from a customer to access one of the plurality of host computer devices; and
use a nonencrypted or an encrypted communication channel to communicate between one host computer device of the plurality of host computer devices and the customer.

18. A non-transitory computer-readable medium storing instructions executable by a computer device, comprising: at least one instruction for causing the computer device to establish a first trusted internet protocol (IP) address for a first host computer device of a plurality of host computer devices on a network rack in communication with a trusted network, wherein the first trusted IP address is associated with a physical IP address of the first host computer device; at least one instruction for causing the computer device to use the first trusted IP address to establish a first VPN tunnel directly between the first host computer device and a VPN server over the physical IP address of the first host computer device; at least one instruction for causing the computer device to securely transmit data packets between the first host computer device and the VPN sever using the first VPN tunnel; and at least one instruction for causing the computer device to establish a second trusted IP address for a second host computer device of the plurality of host computer devices on the network rack in communication with the trusted network, wherein the second trusted IP address is associated with a physical IP address of the second host computer device, wherein establishing the first trusted IP address and the second trusted IP address includes exchanging using a common key received in a broadcast message with a packet encrypted with the common key sent to the physical IP address associated with the first host computer device and to the physical IP address of the second host computer device.

* * * * *

UNITED STATES PATENT AND TRADEMARK OFFICE
CERTIFICATE OF CORRECTION

PATENT NO. : 11,729,187 B2
APPLICATION NO. : 16/798756
DATED : August 15, 2023
INVENTOR(S) : Gerardo Diaz-Cuellar et al.

Page 1 of 1

It is certified that error appears in the above-identified patent and that said Letters Patent is hereby corrected as shown below:

In the Specification

In Column 1, Line 38, change "sever" to --server--.

In Column 1, Line 53, change "sever" to --server--.

In Column 2, Line 4, change "sever" to --server--.

In Column 11, Line 22, change "sever" to --server--.

In the Claims

In Column 14, Line 13, change "sever" to --server--.

In Column 14, Line 42, change "sever" to --server--.

In Column 15, Line 39, change "sever" to --server--.

In Column 16, Line 2, change "sever" to --server--.

In Column 16, Line 65, change "sever" to --server--.

Signed and Sealed this
First Day of April, 2025

Coke Morgan Stewart
*Acting Director of the United States Patent and Trademark Office*